(12) United States Patent
Hara

(10) Patent No.: US 10,532,788 B2
(45) Date of Patent: Jan. 14, 2020

(54) BICYCLE OPERATING DEVICE

(71) Applicant: Shimano Inc., Sakai, Osaka (JP)

(72) Inventor: Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 280 days.

(21) Appl. No.: 15/581,732

(22) Filed: Apr. 28, 2017

(65) Prior Publication Data

US 2018/0312212 A1 Nov. 1, 2018

(51) Int. Cl.
*B62K 23/06* (2006.01)
*F16C 1/18* (2006.01)
*B62J 1/08* (2006.01)

(52) U.S. Cl.
CPC .......... *B62K 23/06* (2013.01); *B62J 1/08* (2013.01); *F16C 1/18* (2013.01); *B62J 2001/085* (2013.01)

(58) Field of Classification Search
CPC . B62K 23/06; B62K 25/08; B62J 1/08; B62L 3/023; F16C 1/18
See application file for complete search history.

(56) References Cited

U.S. PATENT DOCUMENTS

| | | | | |
|---|---|---|---|---|
| 4,974,469 A * | 12/1990 | Romano | ........... | B62K 23/06 74/489 |
| 5,149,034 A * | 9/1992 | Ganaja | ........... | B62K 19/36 248/178.1 |
| 6,991,081 B2 | 1/2006 | Uno et al. | | |
| 8,272,293 B2 | 9/2012 | Miki et al. | | |
| 8,833,848 B2 | 9/2014 | Shirai | | |
| 2011/0070017 A1* | 3/2011 | Tsumiyama | ........... | B60T 7/102 403/6 |
| 2015/0291248 A1* | 10/2015 | Fukao | ........... | B62K 23/02 74/501.6 |
| 2015/0307154 A1* | 10/2015 | Miki | ........... | B62L 3/00 74/491 |
| 2018/0285807 A1* | 10/2018 | Miyazaki | ........... | G06Q 10/087 |
| 2018/0312212 A1* | 11/2018 | Hara | ........... | B62K 23/06 |

* cited by examiner

*Primary Examiner* — Vicky A Johnson
(74) *Attorney, Agent, or Firm* — Global IP Counselors, LLP

(57) ABSTRACT

A bicycle operating device is basically provided with a first base member, a lever and an operating unit. The first base member includes a first end portion and a second end portion. The first end portion is configured to be coupled to a handlebar. The second end portion is opposite to the first end portion. The first base member extends along a longitudinal direction from the first end portion to the second end portion. The lever is pivotally coupled to the first base member about a lever axis. The operating unit includes a second base member and an operating member. The second base member includes a mounting portion that is mounted to the second end portion of the first base member. The operating member is movably coupled to the second base member between a rest position and an operated position to operate a bicycle telescopic apparatus.

20 Claims, 14 Drawing Sheets

BICYCLE OPERATING DEVICE

BACKGROUND

Field of the Invention

This invention generally relates to a bicycle operating device. More specifically, the present invention relates to a bicycle operating device that can be configured to selectively operate two bicycle components.

Background Information

Bicycles are often provided with one or more bicycle components that can be operated and/or adjusted by a rider while riding. Examples of some these bicycle components include a gear changing device (e.g., a derailleur or an internally geared hub), a suspension and a seatpost. A bicycle operating device is usually provided on a bicycle (e.g., on a bicycle handlebar) for a rider to operate and/or adjust these bicycle components. The bicycle operating device is often connected to the bicycle components with, for example, a Bowden-type control cable, an electrical wire or a hydraulic hose.

SUMMARY

Generally, the present disclosure is directed to various features of a bicycle operating device. One aspect disclosed in the present disclosure is to provide a bicycle operating device that can be configured to selectively operate two bicycle components.

In view of the state of the known technology and in accordance with a first aspect of the present disclosure, a bicycle operating device is provided that basically comprises a first base member, a lever and an operating unit. The first base member includes a first end portion and a second end portion. The first end portion is configured to be coupled to a handlebar in a mounted state where the bicycle operating device is mounted to the handlebar. The second end portion is opposite to the first end portion. The first base member extends along a longitudinal direction from the first end portion to the second end portion. The lever is pivotally coupled to the first base member about a lever axis. The operating unit includes a second base member and an operating member. The second base member includes a mounting portion that is configured to be mounted to the second end portion of the first base member. The operating member is movably coupled to the second base member between a rest position and an operated position to operate a bicycle telescopic apparatus.

According to the first aspect of the present invention, it is possible to provide an operating device integrated with an operating unit to control a height adjustable seatpost or a front/rear suspension that is easily operated by a rider during riding via the operating member.

In accordance with a second aspect of the present invention, a bicycle operating device is provided that basically comprises a first base member, a lever and an operating unit. The first base member includes a first end portion and a second end portion. The first end portion is configured to be coupled to a handlebar in a mounted state where the bicycle operating device is mounted to the handlebar. The second end portion is opposite to the first end portion. The first base member has a longitudinal direction from the first end portion to the second end portion. The lever is pivotally coupled to the first base member about a lever axis. The operating unit includes a second base member and an operating member. The second base member includes a mounting portion that is configured to be detachably mounted to a mounting surface of the second end portion of the first base member. The mounting surface faces the longitudinal direction of the first base member. The operating member is movably coupled to the second base member between a rest position and an operated position to operate a bicycle telescopic apparatus.

According to the second aspect of the present invention, it is possible to provide an operating device to which the operating unit is selectively mounted to the second end of the first base member.

In accordance with a third aspect of the present invention, the bicycle operating device according to the first aspect is configured so that the mounting portion is configured to be detachably mounted to a mounting surface of the second end portion of the first base member.

According to the third aspect of the present invention, it is possible to provide an operating device to which the operating unit is selectively mounted to the second end of the first base member.

In accordance with a fourth aspect of the present invention, the bicycle operating device according to the third aspect is configured so that the mounting surface faces the longitudinal direction of the first base member.

According to the fourth aspect of the present invention, it is possible to provide an operating device to which the operating unit is selectively mounted to the second end of the first base member.

In accordance with a fifth aspect of the present invention, the bicycle operating device according to any one of the first to fourth aspects is configured so that the operating member includes a mechanical control cable attachment. The operating member is movable relative to the second base member between the rest position and the operated position to move a mechanical control cable.

According to the fifth aspect of the present invention, it is possible to provide an operating device integrated with an operating unit to control a height adjustable seatpost or a front/rear suspension that is actuated by a mechanical control cable.

In accordance with a sixth aspect of the present invention, the bicycle operating device according to the fifth aspect is configured so that the operating member is configured to move the mechanical control cable without mechanically maintaining the mechanical control cable in a predetermined set position relative to the second base member during movement between the rest position and the operated position.

According to the sixth aspect of the present invention, it is possible to provide a compact operating unit since the operating unit does not need to include a mechanical maintaining structure for a mechanical control cable.

In accordance with a seventh aspect of the present invention, the bicycle operating device according to the fifth or sixth aspect is configured so that the operating unit includes a cable take-up member configured to take up the mechanical control cable relative to the second base member.

According to the seventh aspect of the present invention, it is possible to provide an operating device integrated with an operating unit to control a height adjustable seatpost or a front/rear suspension that is actuated by a mechanical control cable.

In accordance with an eighth aspect of the present invention, the bicycle operating device according to the seventh aspect is configured so that the cable take-up member has a take-up axis extending along a direction parallel to the lever axis.

According to the eighth aspect of the present invention, it is possible to arrange the operating member so as to be operated along a side surface of the first base member, since the take-up axis is parallel to the lever axis. Accordingly, it provides an easy operating path for a rider's thumb to operate the operating member.

In accordance with a ninth aspect of the present invention, the bicycle operating device according to the seventh or eighth aspect is configured so that the cable take-up member is configured to protrude from the second end portion in a direction opposite to the first end portion as viewed from a direction parallel to the lever axis in a state where the mounting portion is mounted to the second end portion.

According to the ninth aspect of the present invention, it is possible to arrange the operating member adjacent to the side surface of the first base member for easy operation.

In accordance with a tenth aspect of the present invention, the bicycle operating device according to any one of the first to ninth aspects is configured so that the second base member further includes an operating member attachment portion to which the operating member is attached. The operating member attachment portion is at least partly offset from the mounting portion along a direction of the lever axis.

According to the tenth aspect of the present invention, it is possible to arrange the operating member adjacent to the side surface of the first base member for easy operation.

In accordance with an eleventh aspect of the present invention, the bicycle operating device according to the tenth aspect is configured so that the operating unit includes a cable take-up member configured to take up a mechanical control cable relative to the second base member. The operating member attachment portion includes an internal space in which the cable take-up member is disposed.

According to the eleventh aspect of the present invention, it is possible to arrange the operating member adjacent to the side surface of the first base member for easy operation.

In accordance with a twelfth aspect of the present invention, the bicycle operating device according to any one of the first to eleventh aspects is configured so that the operating unit includes a hydraulic operating structure configured to transmit a hydraulic pressure in response to operation of the operating member.

According to the twelfth aspect of the present invention, it is possible to provide an operating device integrated with an operating unit to control a height adjustable seatpost or a front/rear suspension that is actuated by a hydraulic pressure.

In accordance with a thirteenth aspect of the present invention, the bicycle operating device according to any one of the first to eleventh aspects is configured so that the operating unit includes an electrical switch configured to output a signal to control the bicycle telescopic apparatus in response to operation of the operating member.

According to the thirteenth aspect of the present invention, it is possible to provide an operating device integrated with an operating unit to control a height adjustable seatpost or a front/rear suspension that is actuated by an electrical signal.

In accordance with a fourteenth aspect of the present invention, the bicycle operating device according to the thirteenth aspect is configured so that the operating unit includes a wireless signal transmitter configured to wirelessly transmit the signal.

According to the fourteenth aspect of the present invention, it is possible to provide an operating device integrated with an operating unit to control a height adjustable seatpost or a front/rear suspension that is actuated by a wireless electrical signal.

In accordance with a fifteenth aspect of the present invention, the bicycle operating device according to any one of the first to fourteenth aspects is configured so that the operating member is movable about a pivot axis that is disposed farther from the first end portion than the lever axis in the longitudinal direction in a state where the mounting portion is mounted to the second end portion.

According to the fifteenth aspect of the present invention, it is possible to arrange the operating member so as to be operated along a side surface of the first base member. Accordingly, it provides an easy operating path for a rider's thumb to operate the operating member.

In accordance with a sixteenth aspect of the present invention, the bicycle operating device according to any one of the first to fifteenth aspects is configured so that the operating member moves along an operation path that intersects with the lever axis as viewed from a direction parallel to the lever axis.

According to the sixteenth aspect of the present invention, it is possible to arrange the operating member so as to be operated along a side surface of the first base member. Accordingly, it provides an easy operating path for a rider's thumb to operate the operating member.

In accordance with a seventeenth aspect of the present invention, the bicycle operating device according to any one of the first to sixteenth aspects is configured so that the first base member includes a first side surface and a second side surface facing opposite to the first side surface with respect to a direction parallel to the lever axis. The first side surface is disposed closer to a longitudinal center plane of a bicycle in the mounted state where the first end portion is coupled to the handlebar. The operating member is configured to at least partially face the first side surface in a state where the mounting portion is mounted to the second end portion.

According to the seventeenth aspect of the present invention, it is possible to arrange the operating member adjacent to the side surface of the first base member for easy operation.

In accordance with an eighteenth aspect of the present invention, the bicycle operating device according to any one of the first to seventeenth aspects is configured so that the first base member includes a gripping portion between the first end portion and the second end portion in the longitudinal direction. The second end portion includes a pommel portion, and the mounting portion is configured to be mounted to the pommel portion.

According to the eighteenth aspect of the present invention, it is possible to arrange the operating member adjacent to the pommel portion for easy operation.

In accordance with a nineteenth aspect of the present invention, the bicycle operating device according to any one of the first to eighteenth aspects is configured so that the mounting portion is configured to form an exterior profile of a part of the pommel portion in a state where the mounting portion is mounted to the pommel portion.

According to the nineteenth aspect of the present invention, it is possible to provide an operating device integrated with an operating unit that form seamless surface of the pommel portion.

In accordance with a twentieth aspect of the present invention, the bicycle operating device according to any one of the first to fourteenth aspects further comprises a cover configured to be detachably mounted to the second end portion in place of the operating unit.

According to the twentieth aspect of the present invention, it is possible to replace an operating unit with a cover for a bicycle without a bicycle telescopic apparatus.

Also other objects, features, aspects and advantages of the disclosed bicycle operating device will become apparent to those skilled in the art from the following detailed description, which, taken in conjunction with the annexed drawings, discloses one embodiment of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
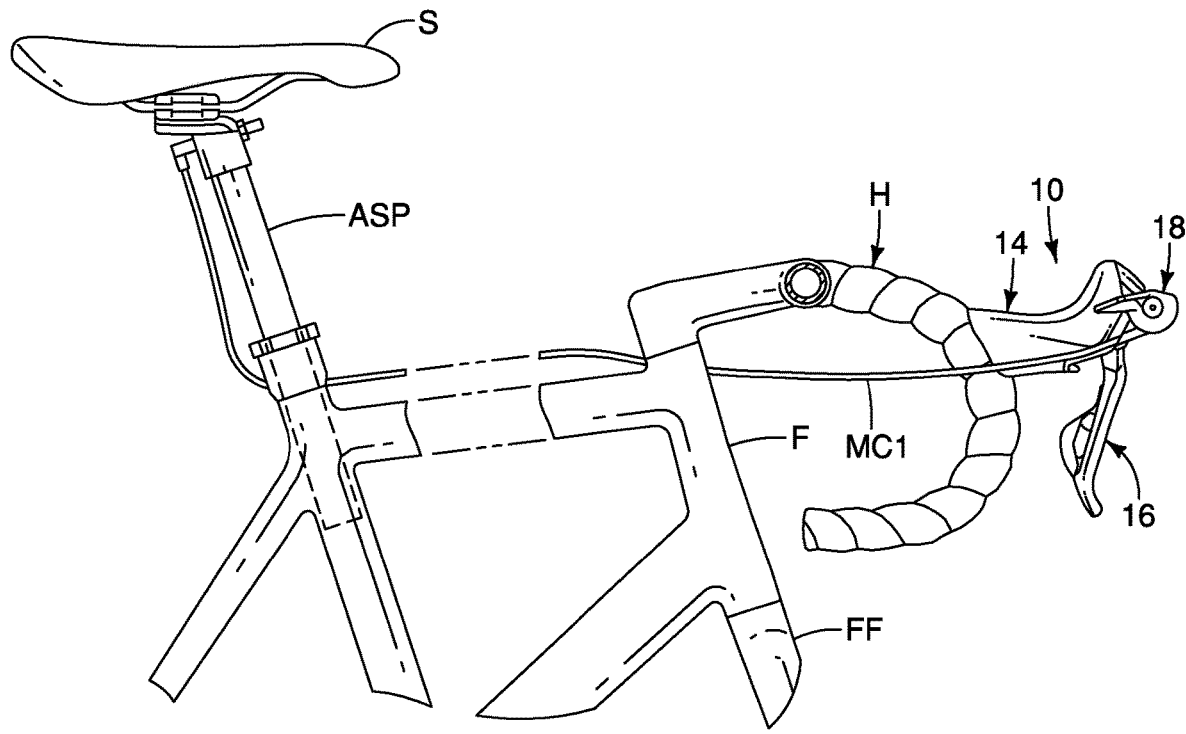
FIG. 1 is a partial side elevational view of a portion of a bicycle equipped with a bicycle operating device having a first base member, a lever pivotally mounted to the first base member and an operating unit detachably mounted to the first base member in accordance with a first illustrated embodiment.

Referring initially to FIG. 1, a bicycle 1 is illustrated that is equipped with a bicycle operating device 10 in accordance with a first embodiment. The bicycle operating device 10 is mounted to a handlebar H of the bicycle 1. Specifically, in the first embodiment, the handlebar H is a drop handlebar that is fixed to an upper end of a front fork FF in a conventional manner such as with a handlebar stem. However, the bicycle operating device 10 can be configured to be mounted to other type of handlebars such as a flat handlebar, a time trial handlebar and a bull horn handlebar. The bicycle operating device 10 has a height adjustable seatpost ASP that adjusts the height of the seat or saddle S with respect to a bicycle frame F of the bicycle. The height adjustable seatpost ASP is one example of a bicycle telescopic apparatus. In the first embodiment, the bicycle operating device 10 is mounted a left-hand side on the handlebar H.

Figure 2:
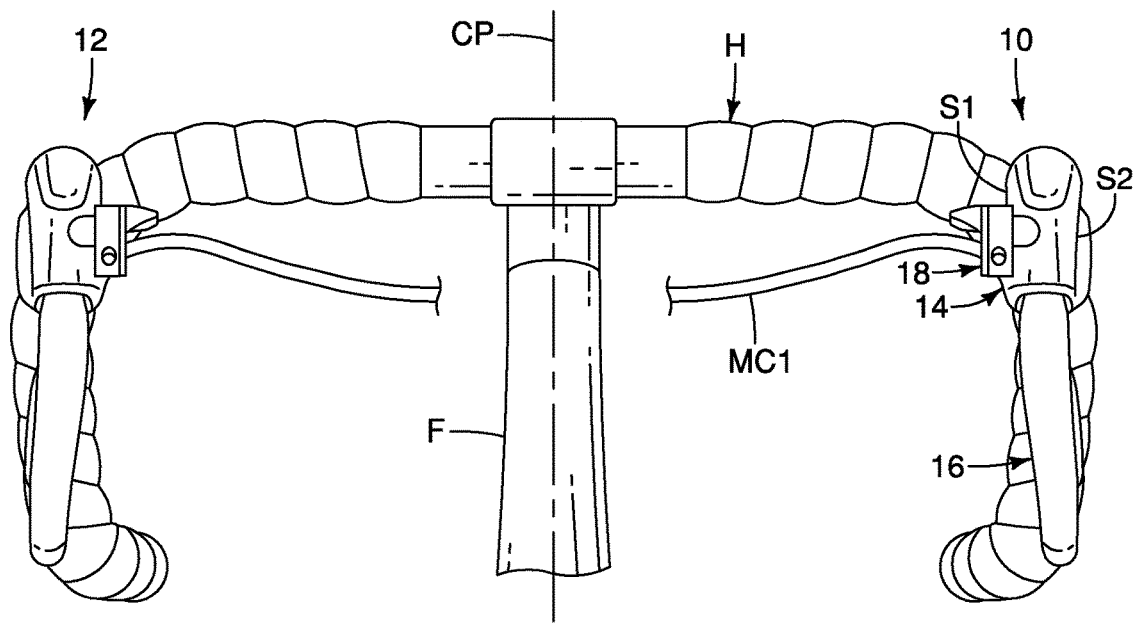
FIG. 2 is a front elevational view of a handlebar area of the bicycle illustrated in FIG. 1 with a pair of the bicycle operating devices in accordance with the first illustrated embodiment.

As seen in FIG. 2, in the first embodiment, the bicycle operating device 10 is mounted a left-hand side on the handlebar H. Preferably, the bicycle 1 is further provided with a bicycle operating device 12 on a right-hand side on the handlebar H. The bicycle operating device 12 is identical to the bicycle operating device 10, except that the bicycle operating device 12 is a mirror image of the bicycle operating device 10. Thus, the descriptions of the parts of the bicycle operating device 10 applies to the corresponding parts of the bicycle operating device 12. For this reason, only bicycle operating device 10 will be discussed and illustrated in further detail herein.

Figure 3:
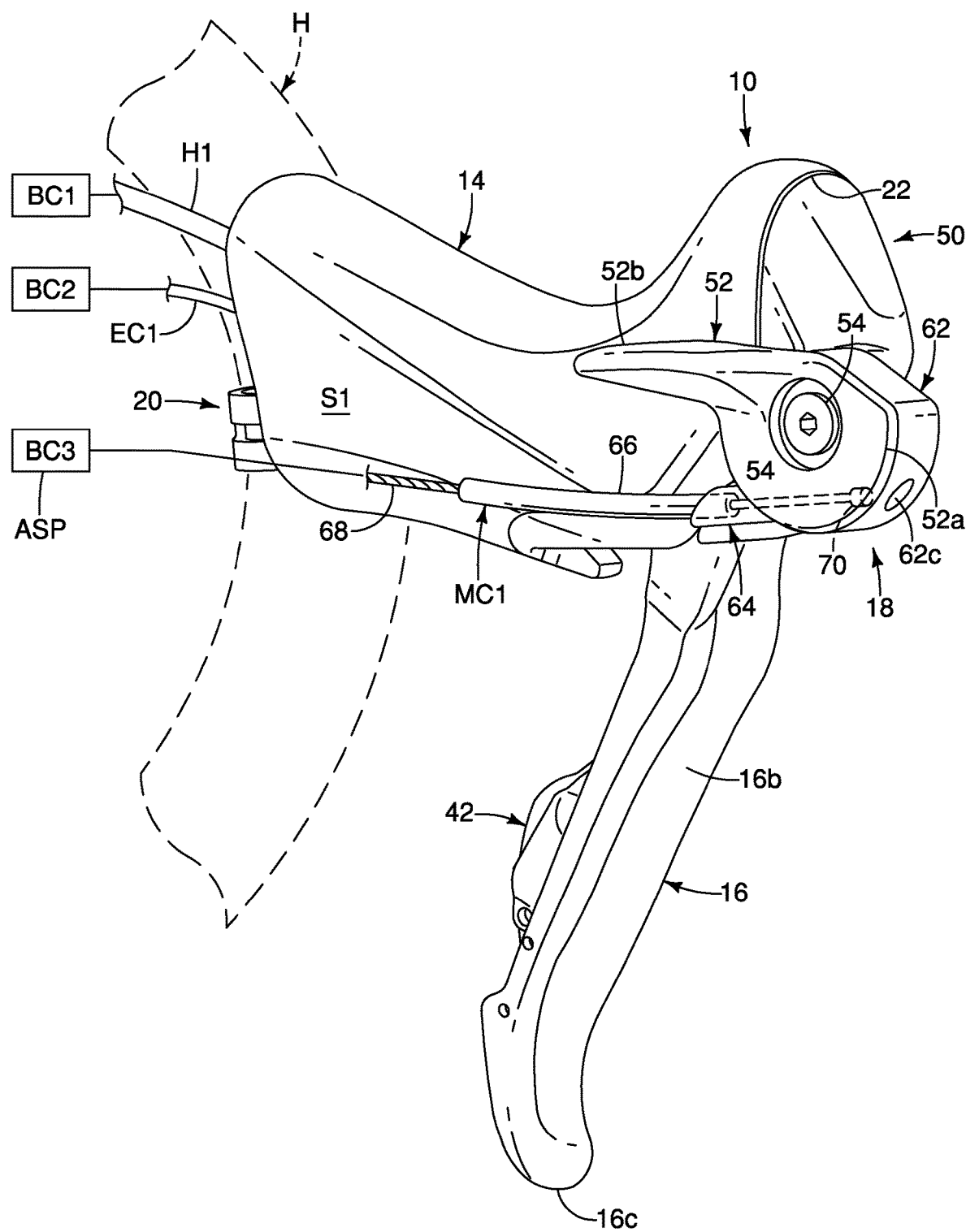
FIG. 3 is an enlarged side perspective view of the left-hand side bicycle operating device illustrated in FIGS. 1 and 2 with the lever and an operating member of the operating unit in rest positions.

As diagrammatically illustrated in FIG. 3, the bicycle operating device 10 is operatively coupled to three bicycle components BC1, BC2 and BC3. Specifically, in the first embodiment, the bicycle component BC1 is a hydraulically operated bicycle component such as a hydraulic brake device. The bicycle component BC2 is an electrically operated bicycle component such as a bicycle transmission in the first embodiment. The bicycle component BC3 is a mechanically operated bicycle component such as the height adjustable seatpost ASP that is shown in FIG. 1 of the first embodiment or a bicycle suspension (not shown).

Here, the bicycle operating device 10 operates a front brake device (i.e., the bicycle component BC1) via a hydraulic hose H1, a front transmission (i.e., the bicycle component BC2) via a conventional electrical cable EC1 and the height adjustable seatpost ASP (i.e., the bicycle component BC3) via a conventional mechanical control cable MC1 (e.g., a Bowden cable). However, the structures of the bicycle operating device 10 can also be applied to a right-hand side operating device that is configured to be mounted to a right-hand side on the handlebar H. The electrical operated bicycle component BC2 can be omitted if needed and/or desired. In other words, the bicycle operating device 10 can be configured without the structure for operating the electrical operated bicycle component BC2. On the other hand, the bicycle operating device 12 operates a rear brake device (not shown), a rear transmission and a bicycle telescopic apparatus such as a suspension.

As seen in FIGS. 3 to 6, the bicycle operating device 10 basically comprises a first base member 14, a lever 16 and an operating unit 18. Here, in the first embodiment, the first base member 14 further comprises a mounting structure 20 to mount the first base member 14 to the bicycle handlebar H. The bicycle operating device 10 further comprises a grip cover 22 attached to the first base member 14 to at least partly cover the first base member 14. The grip cover 22 is made of a non-metallic material such as rubber.

Basically, the first base member 14 is a stationary member in a state in which the bicycle operating device 10 is mounted to the bicycle handlebar H. The first base member 14 includes a first end portion 14*a* and a second end portion 14*b*. The second end portion 14*b* is opposite to the first end portion 14*a*. The first base member 14 extends along a longitudinal direction L from the first end portion 14*a* to the second end portion 14*b*. In other words, the first base member 14 has the longitudinal direction L from the first end portion 14*a* to the second end portion 14*b*. As used herein, the longitudinal direction L of the bicycle operating device 10 refers to a direction parallel to a fore-aft direction of the bicycle 1 in a state where the first base member 14 is mounted to the bicycle handlebar H. The first base member 14 includes a gripping portion 14*c* that is between the first end portion 14*a* and the second end portion 14*b* in the longitudinal direction L. The second end portion 14*b* includes a pommel portion 14*d*. The pommel portion 14*d* extends forwardly and upwardly from the second end portion 14*b* in the mounted state where the first base member 14 is mounted to the bicycle handlebar H. In the first embodiment, the first end portion 14*a*, the second end portion 14*b* and the grip portion 14*c* constitutes a main body that is integrally formed as a one-piece member from a single material. The main body (i.e., the portions 14*a*, 14*b* and 14*c*) of the first base member 14 is preferably injection molded from a resin material.

In the first embodiment, the lever 16 is a brake lever. The lever 16 is pivotally coupled to the first base member 14 about a lever axis A1. Here, in the first embodiment, the bicycle operating device 10 is configured as a road brifter (i.e. a combined shifter and brake operating device), in which case, the first base member 14 is often called a bracket or a road shifter bracket. The lever 16 includes an attachment portion 16*a* and a user operating portion 16*b*. The attachment portion 16*a* is attached to the first base member 14 by a pivot shaft 24 that defines the lever axis A1. The attachment portion 16*a* is partially disposed inside the first base member 14, while the user operating portion 16*b* is an elongated member that extends outwardly from the first base member 14 to a free end 16*c*. The lever 16 is made from a hard, rigid material such as a hard resin material or metallic material.

Figure 4:
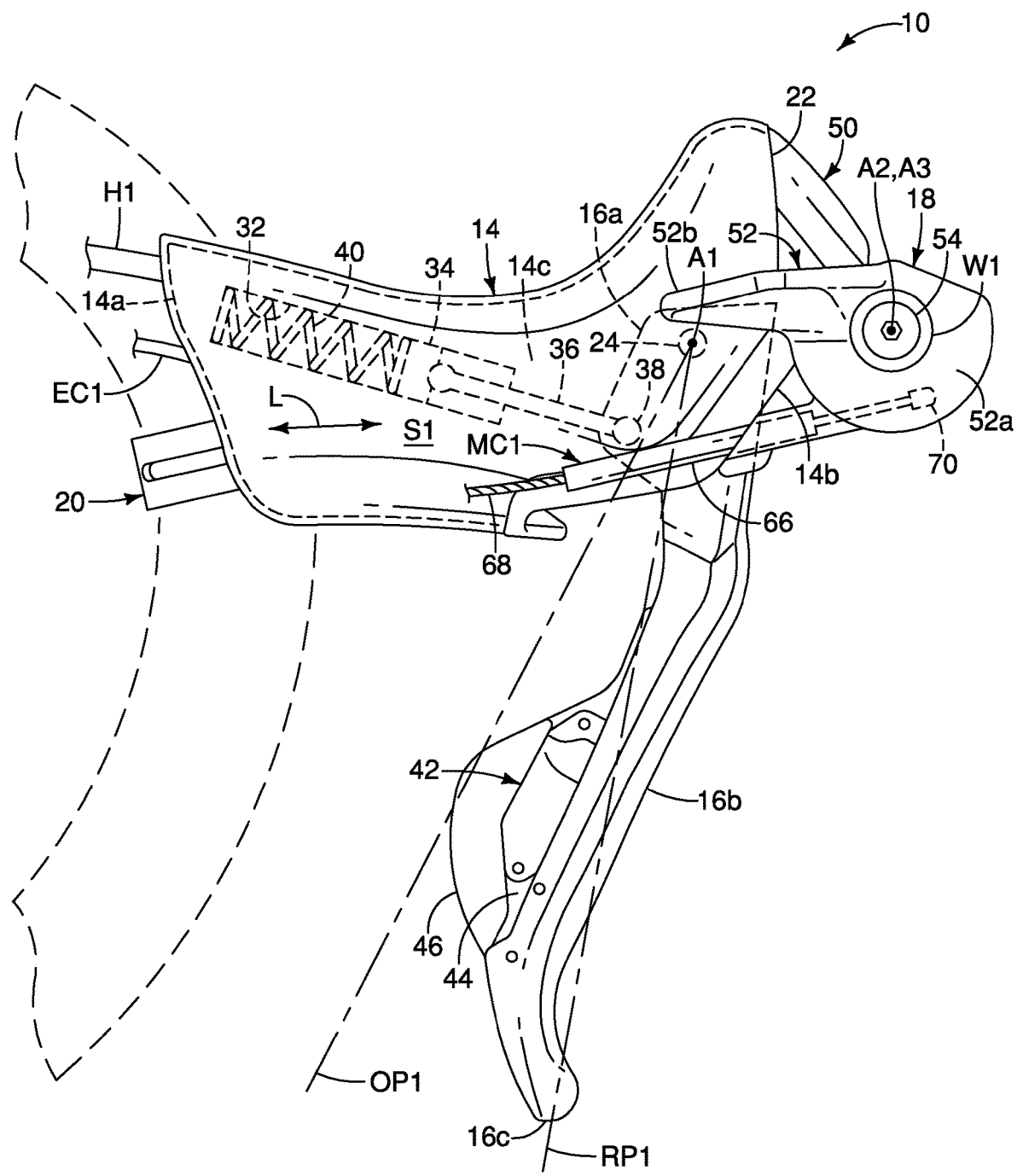
FIG. 4 is an inwardly facing side elevational view of the bicycle operating device illustrated in FIG. 3 with the lever and the operating member of the operating unit in the rest positions.

Referring to FIGS. 2 to 5, the first base member 14 includes a first side surface S1 (see FIG. 4) and a second side surface S2 (see FIG. 5) facing opposite to the first side surface S1 with respect to a direction parallel to the lever axis A1. As seen in FIG. 2, the first side surface S1 is disposed closer to a longitudinal center plane CP of the bicycle 1 in the mounted state where the first end portion 14*a* is coupled to the handlebar H. The operating member 52 is configured to at least partially face the first side surface in a state where the mounting portion 60 is mounted to the second end portion 14*b*. In the illustrated embodiment, a user operating portion 52*b* (described below) faces the first side surface S1 as shown in FIG. 4.

The first end portion 14*a* is configured to be coupled to the handlebar H in a mounted state where the bicycle operating device 10 is mounted to the handlebar H. Specifically, the mounting structure 20 is mounted to the first end portion 14*a* to mount the first base member 14 to the bicycle handlebar H. Preferably, the first end portion 14*a* has a curved end surface 18*a*1 that contacts the bicycle handlebar H when the first base member 14 is mounted to the bicycle handlebar H by the mounting structure 20. Basically, the mounting structure 20 preferably includes a band clamp and a tightening member. The tightening member is coupled to the band clamp to clamp the bicycle handlebar H between the band clamp and the curved end surface of the first end portion 14*a*. Here, the tightening member includes a mounting bolt and a nut. However, the mounting structure 20 is not limited to the illustrated structure, but can include other mounting structures which are used for mounting a road shifter to a drop handlebar.

Figure 6:
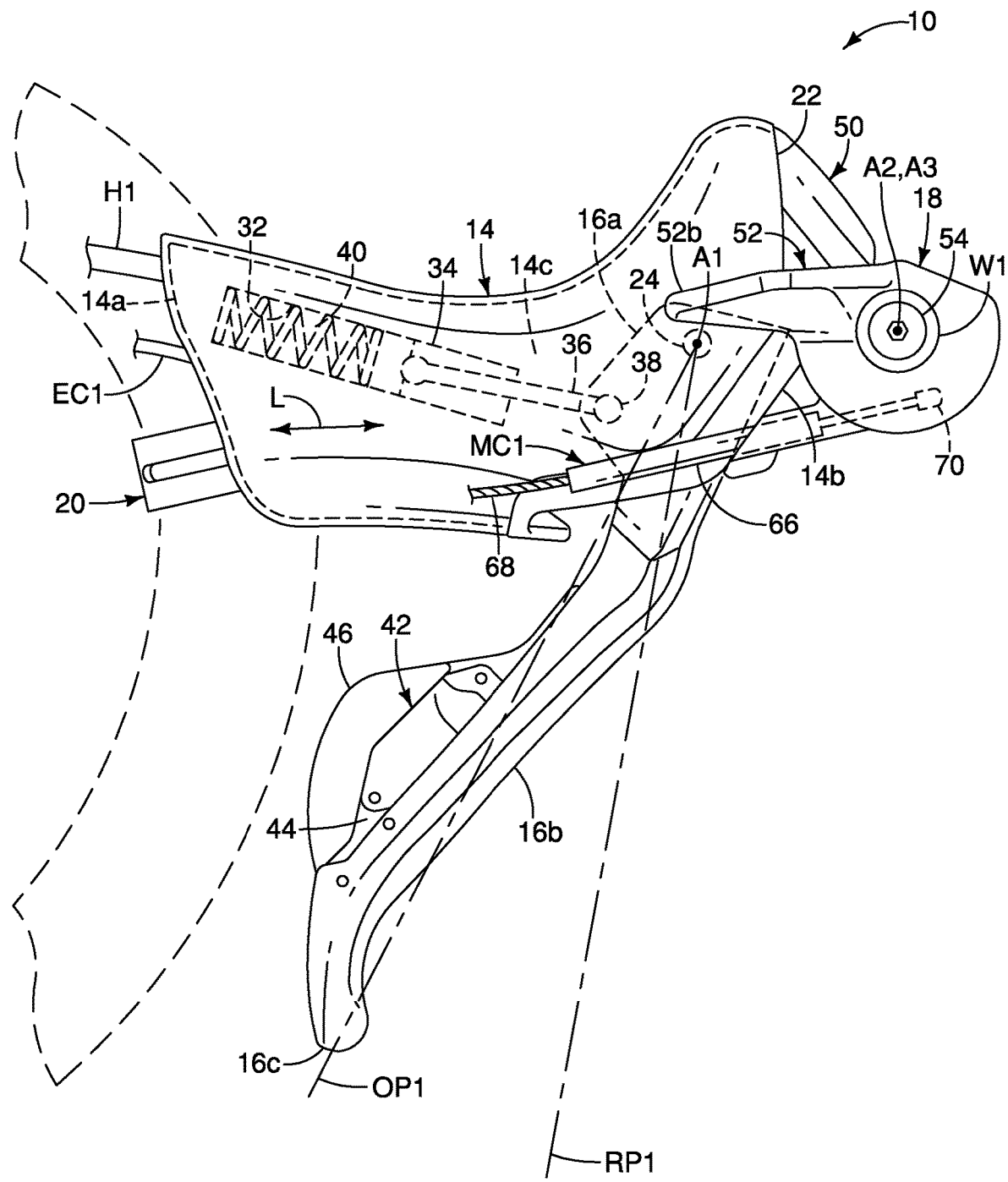
FIG. 6 is an inwardly facing side elevational view of the bicycle operating device illustrated in FIGS. 3 to 5 with the lever moved towards an operated position and the operating member of the operating unit in the rest position.

Here, the bicycle operating device 10 further comprises a hydraulic unit 30 for supplying pressurized hydraulic fluid to the hydraulic bicycle component BC1 in response to movement of the lever 16 from the rest position RP1 (FIGS. 1 to 4) to an operated or actuated position OP1 (FIG. 6). As used herein, the term "rest position" refers to a position at which a movable part such as the lever 16 remains stationary in a state where the movable part is not operated by the user. The terms "operated position" and "actuated position" as used herein refer to a position at which the movable part has been moved by the user from a rest position.

Figure 5:
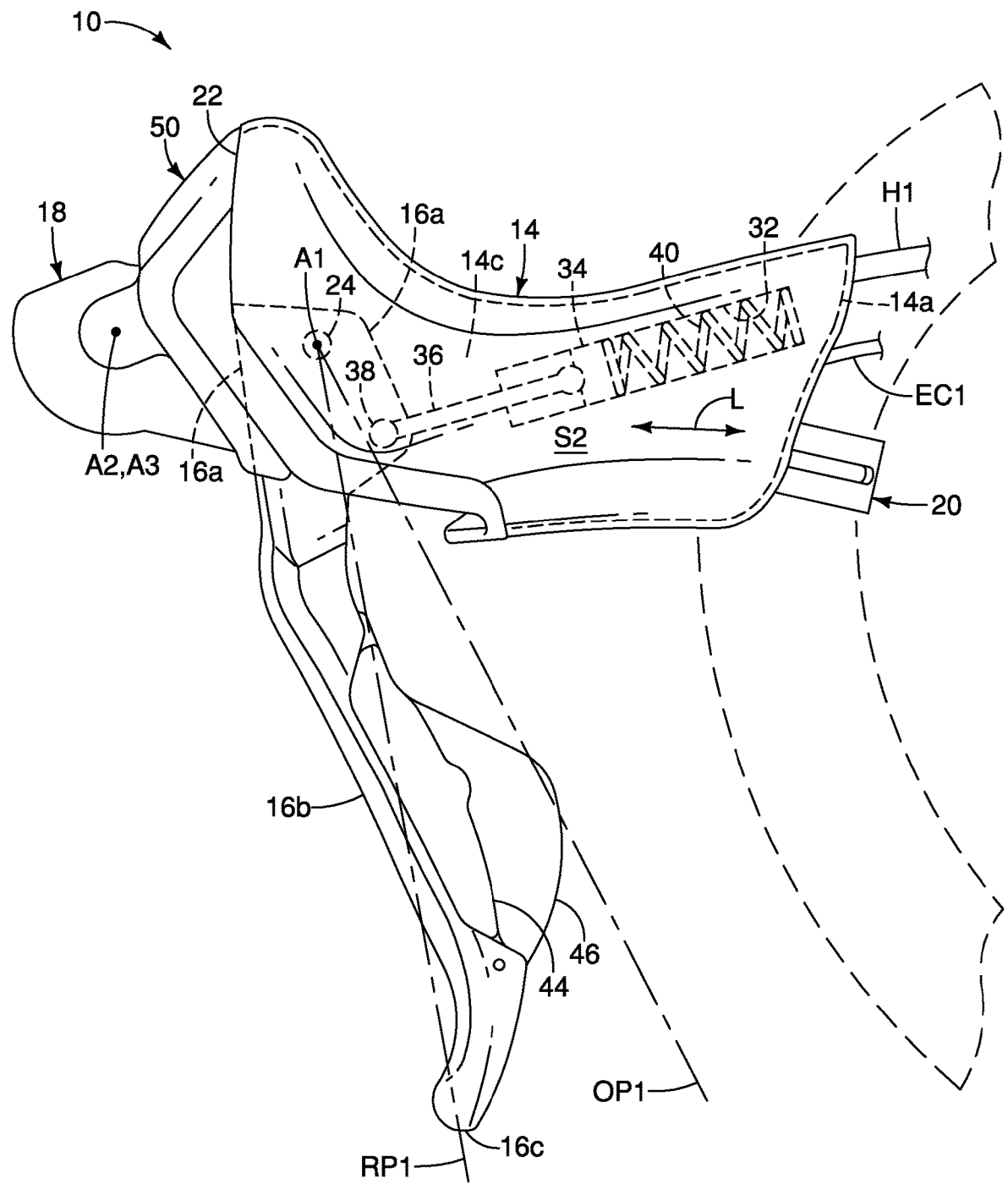
FIG. 5 is an outwardly facing side elevational view of the bicycle operating device illustrated in FIGS. 3 and 4 with the lever and the operating member of the operating unit in the rest positions.

Specifically, as seen in FIGS. 4 to 6, the hydraulic unit 30 includes a cylinder bore 32, a piston 34 and a connecting rod 36. Preferably, the hydraulic unit 30 further includes a reservoir (not shown) that is disposed in the pommel portion 14*d* of the first base member 14. The cylinder bore 32 is disposed in the grip portion 14*c* of the first base member 14, and fluidly connected to the reservoir. The piston 34 is slidably disposed in the cylinder bore 32 to reciprocate along a cylinder center axis in response to movement of the lever 16. In particular, the connecting rod 36 has a first end that is pivotally coupled to the lever 16 by a support rod 38, and a second end engaged with the piston 34. The cylinder bore 32 and the piston 34 define a hydraulic chamber that is fluidly connected to the hydraulic hose H1. A coil compression spring 40 (i.e., a biasing element) is disposed in the cylinder bore 32 to bias the piston 34 to a rest (non-actuated) position. The coil compression spring 40 also provides a biasing force on the lever 16 to bias the lever 16 towards the rest position RP1. Alternatively, the lever 16 can have a separate biasing element for biasing the lever 16 towards the rest position RP1.

As seen in FIGS. 3 to 5, the bicycle operating device 10 further comprises a bicycle operating unit 42 that is provided on the user operating portion 16*b* of the lever 16. The bicycle operating unit 42 has a pair of electrical switches 44 and 46 for receiving a user input for upshifting and downshift the bicycle component BC2 (i.e., a bicycle transmission). The bicycle operating unit 42 can be omitted from the bicycle operating device 10.

Referring now to FIGS. 6 to 12, the operating unit 18 will now be discussed in more detail. Here, the operating unit 18 is a mechanical operating unit. The operating unit 18 is detachably supported on the first base member 14. Basically, the operating unit 18 includes a second base member 50 and an operating member 52. In the first embodiment, the second base member 50 is detachably mounted to the first base member 14. The operating member 52 is movably coupled to the second base member 50. For example, the operating member 52 is attached to the second base member 50 by a fastener 54 (e.g., a fixing bolt). The operating member 52 is movable relative to the second base member 50 between a rest position RP2 and an operated position OP2 to operate a bicycle telescopic apparatus (e.g., the height adjustable seat post ASP in the first embodiment) via the mechanical control cable MC1. In the first embodiment, the operating member 52 is movable about a pivot axis A2. The fastener 54 defines the pivot axis A2.

Figure 10:
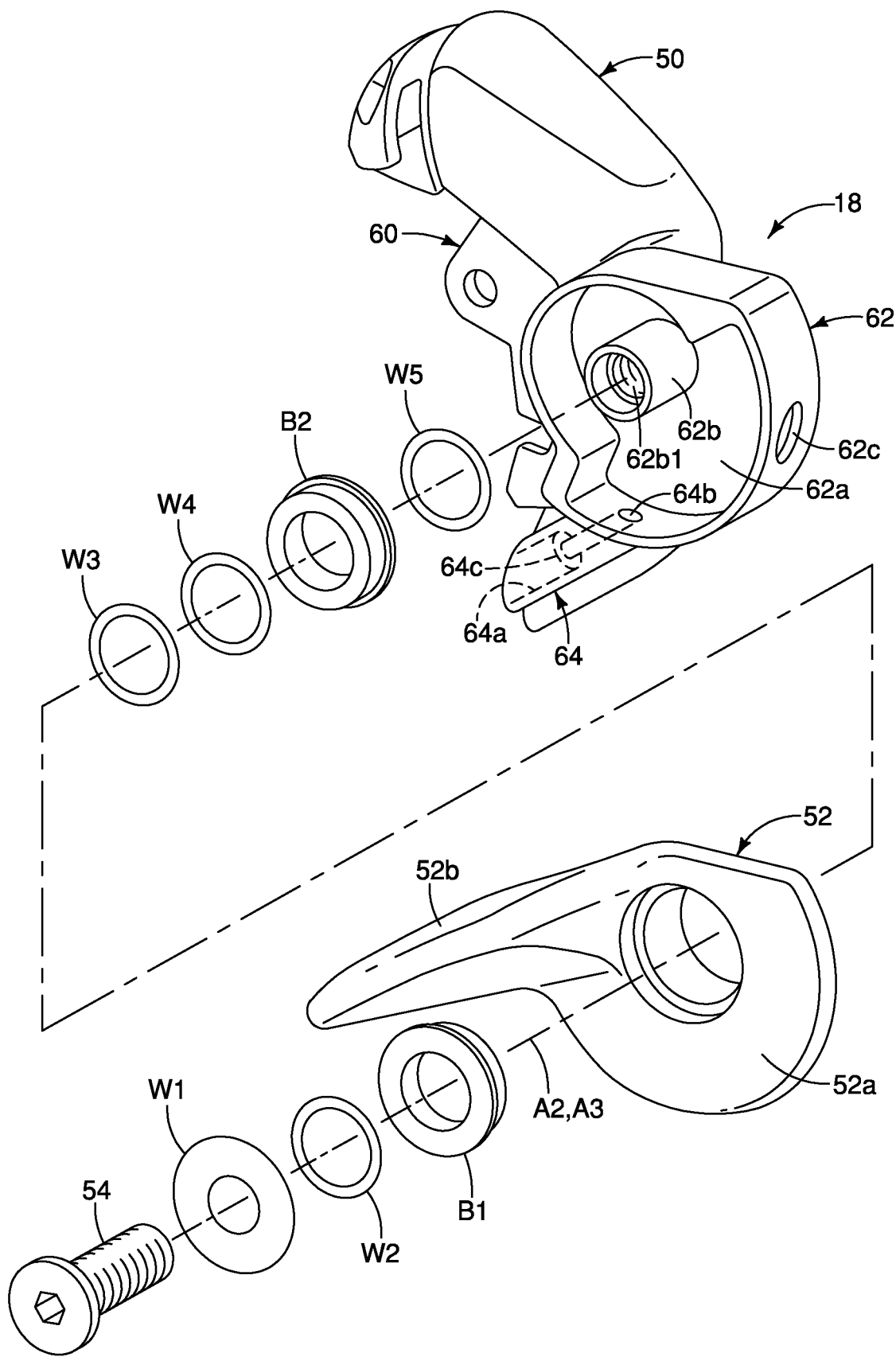
FIG. 10 is an exploded perspective view of the operating unit of the bicycle operating device illustrated in FIGS. 3 to 9.
Figure 11:
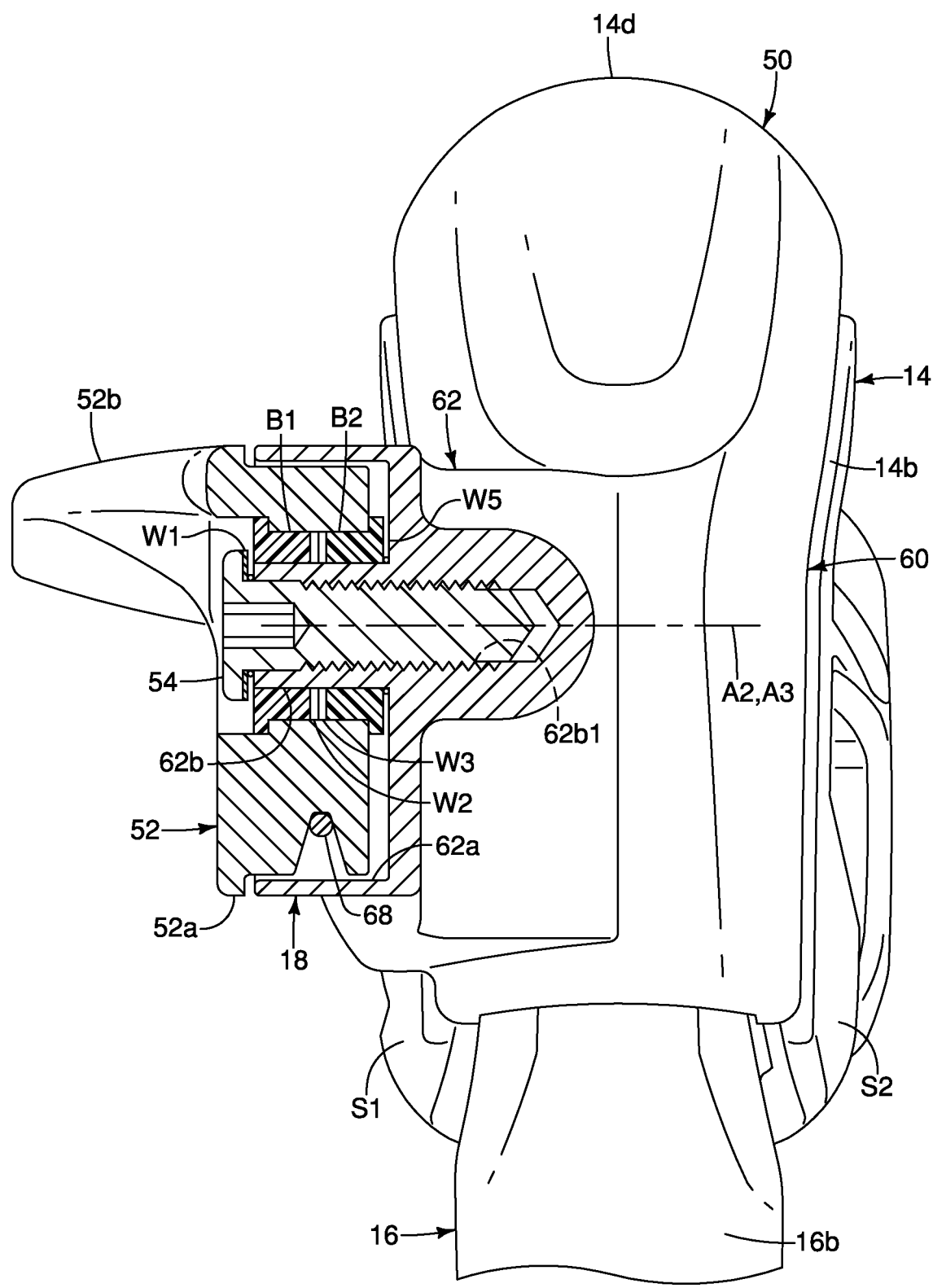
FIG. 11 is a partial cross sectional view of the bicycle operating device as seen along section line 11-11 of FIG. 7.
Figure 12:
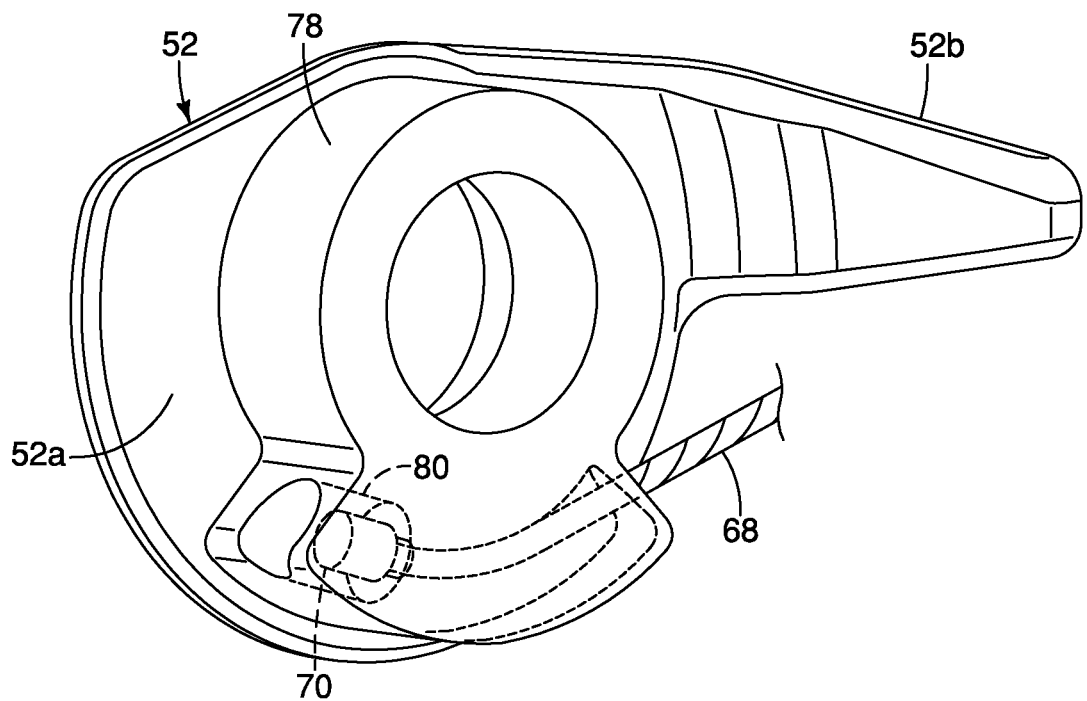
FIG. 12 is a first perspective view of the operating member of the operating unit for the bicycle operating device illustrated in FIGS. 3 to 9.
Figure 13:
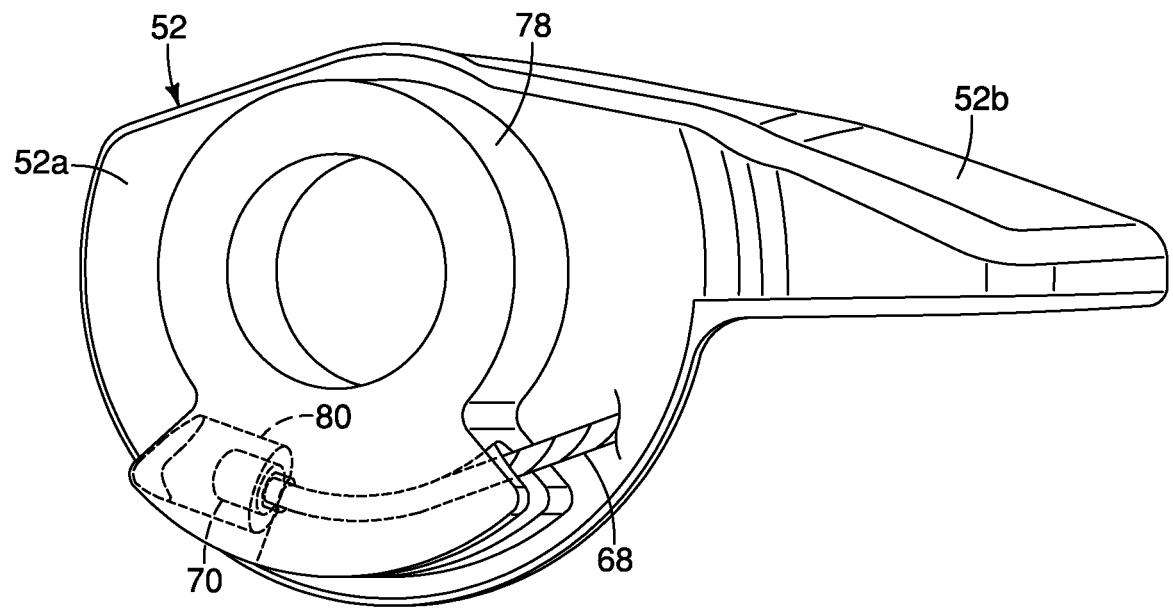
FIG. 13 is a second perspective view of the operating member illustrated in FIG. 12.

In the first embodiment, as seen in FIG. 10, the second base member 50 includes a mounting portion 60. The mounting portion 60 is configured to be mounted to the second end portion 14b of the first base member 14. The second base member 50 further includes an operating member attachment portion 62 to which the operating member 52 is attached. Specifically, the operating member 52 is pivotally attached to the operating member attachment portion 62 of the second base member 50 by the fastener 54. A pair of bushings B1 and B2 and a plurality of washers W1, W2, W3, W4 and W5 are provided between the second base member 50 and the operating member 52 to provide smooth pivotal movement of the operating member 52 with respect to the second base member 50.

In the first embodiment, the mounting portion 60 and the operating member attachment portion 62 are integrally formed as a one-piece member from a single material. For example, the mounting portion 60 and the operating member attachment portion 62 are injection molded from a resin material.

In the first embodiment, the operating member attachment portion 62 includes an internal space 62a. The internal space 62a is configured for pivotally receiving a portion of the operating member 52 as discussed below. Preferably, the operating member attachment portion 62 further includes a support post 62b that is disposed in the internal space 62a. The support post 62b has a threaded hole 62b1 for threadedly receiving the fastener 54. Preferably, the operating member attachment portion 62 further includes an opening 62c for aiding in the attachment of the mechanical control cable MC1.

In the first embodiment, the second base member 50 further includes a cable receiving portion 64 for receiving the mechanical control cable MC1. In particular, the cable receiving portion 64 has a first tubular portion 64a and a second tubular portion 64b. The first tubular portion 64a has a larger transverse width than a transverse width of the second tubular portion 64b such that an axially facing abutment 64c is formed between the first tubular portion 64a and the second tubular portion 64b. The first tubular portion 64a is sized for receiving a portion of an outer casing 66 of the mechanical control cable MC1. The second tubular portion 64b is sized for receiving a portion of an inner wire 68 of the mechanical control cable MC1. The inner wire 68 has a nipple 70 that is attached to the operating member 52.

Preferably, the operating member attachment portion 62 is at least partly offset from the mounting portion 60 along a direction of the lever axis A1. In this way, the operating member 52 is adjacent to the first side surface S1 of the first base member 14 for easy operation. With this configuration, the mechanical control cable MC1 passes along the first side surface S1 of the first base member 14. Alternatively, the cable receiving portion 64 can be configured to direct the mechanical control cable MC1 through a channel provided in the first base member 14.

In the first embodiment, the mounting portion 60 is configured to be detachably mounted to a mounting surface 14b1 of the second end portion 14b of the first base member 14. The mounting portion 60 overlies the mounting surface 14b1. Here, the mounting surface 14b1 faces the longitudinal direction L of the first base member 14. In other words, the mounting surface 14b1 faces in a forwardly in the longitudinal direction L of the bicycle 1 in the mounted state where the bicycle operating device 10 is mounted to the bicycle handlebar H. Preferably, the mounting portion 60 is configured to be mounted to the pommel portion 14d. More preferably, the mounting portion 60 is configured to form an exterior profile of a part of the pommel portion 14d in a state where the mounting portion 60 is mounted to the pommel portion 14d.

Here, the mounting portion 60 is detachably mounted to the pommel portion 14d by a fastener 72 (e.g., a screw in the first embodiment) that passes through an opening in the mounting portion 60 and then is threaded into a threaded hole 14d1 of the pommel portion 14d. Alternatively, the fastener 72 can be replaced with a snap-fit connection or any other suitable connection or fastener that allows the second base member 50 to be repeated detached and reinstalled. Moreover, the mounting portion 60 is detachably mounted to the first base member 14 by a mounting shaft 74 and a screw 76. The mounting shaft 74 passes through openings 14e and 14f in the first base member 14 and an opening 60a in the mounting portion 60. Then the screw 76 is threaded into a threaded hole formed in one end of the mounting shaft 74.

The operating member 52 includes a base portion 52a and a user operating portion 52b. The base portion 52a is pivotally attached to the operating member attachment portion 62 of the second base member 50 by the fastener 54. The user operating portion 52b is an elongated lever portion that extends outwardly from the base portion 52a. As mentioned above, the operating member 52 is movable relative to the second base member 50 between the rest position RP2 and the operated position OP2 to move the mechanical control cable MC1. The operating member 52 moves along an operation path P that intersects with the lever axis A1 as viewed from a direction parallel to the lever axis A1. The pivot axis A2 is disposed farther from the first end portion 14a than the lever axis A1 in the longitudinal direction L in a state where the mounting portion 60 is mounted to the second end portion 14b.

In the first embodiment, the operating unit 18 includes a cable take-up member 78 that is configured to take up the mechanical control cable MC1 relative to the second base member 50. The cable take-up member 78 is configured to freely rotate with the operating member 52. Here, the operating member 52 and the cable take-up member 78 are integrally formed as a one-piece member from a single material. The operating member 52 and the cable take-up member 78 are preferably injection molded as a single piece from a resin material. In the first embodiment, the operating member 52 is configured to move the mechanical control cable MC1 without mechanically maintaining the mechanical control cable MC1 in a predetermined set position relative to the second base member 50 during movement between the rest position RP2 and the operated position OP2. In other words, the operating unit 18 does not include any structure for holding the operating member 52 in any position during movement between the rest position RP2 and the operated position OP2. In other words, there is no intermediate holding position of the mechanical control cable MC1 between the rest position RP2 and the operated position OP2. While the operating member 52 freely rotate moves with respect to the second base member 50 about the pivot axis A2, the operating member 52 could be biased to the rest position such that the operating member 52 operates as a trigger lever. Therefore, the operating member 52 is returned to the rest position by a biasing force after a rider releases the operating member 52 from the operated position. The biasing force of the operating member 52 can be applied by the bicycle component BC3 via the mechanical control cable MC1.

Figure 7:
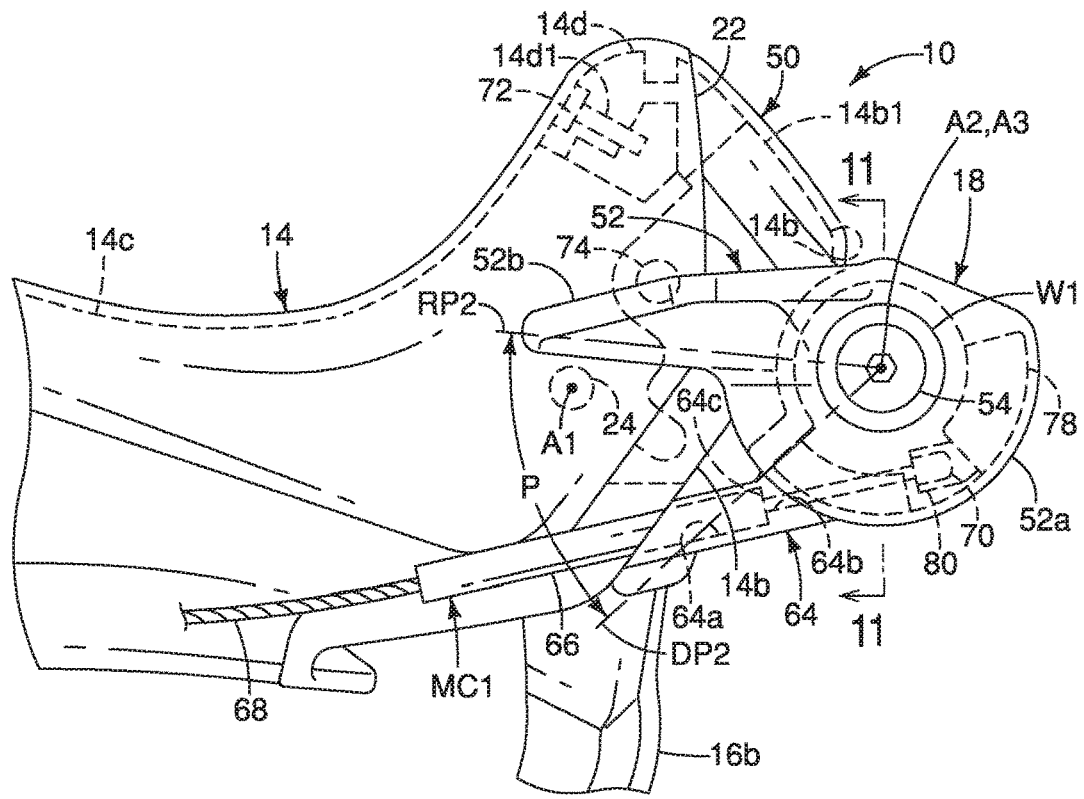
FIG. 7 is an inwardly facing side elevational view of a portion of the bicycle operating device illustrated in FIGS. 3 to 6 with the lever and the operating member of the operating unit in the rest positions.
Figure 8:
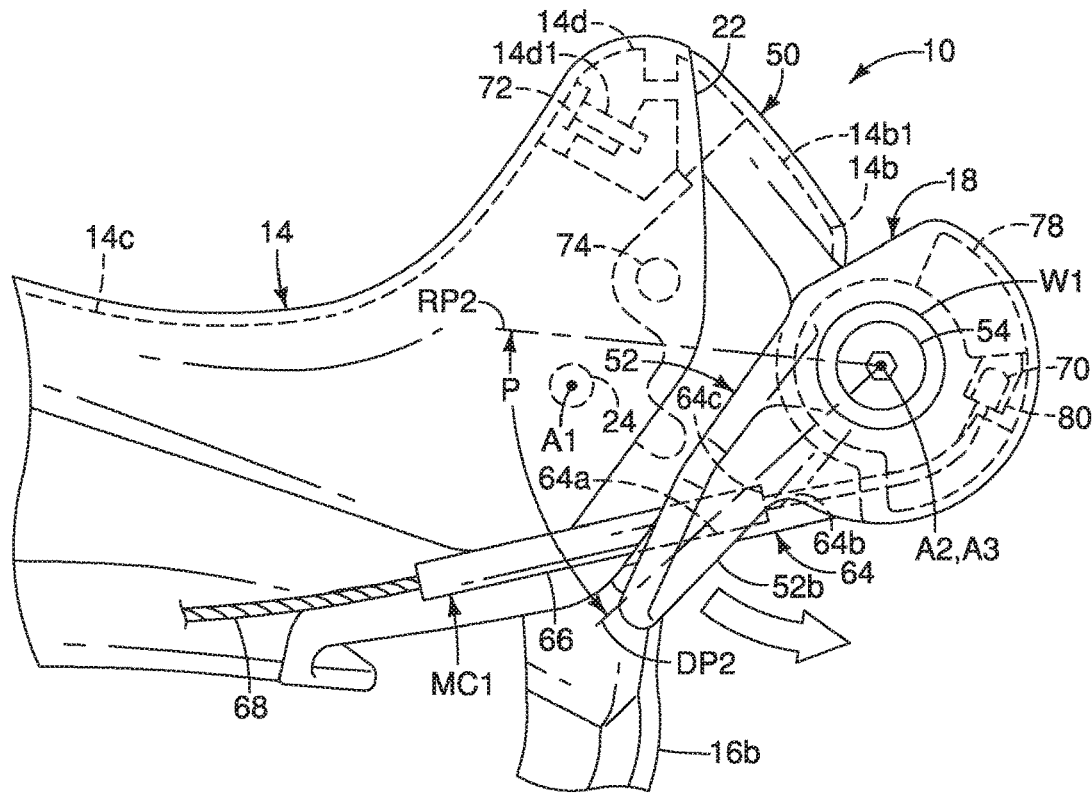
FIG. 8 is an inwardly facing side elevational view of the portion of the bicycle operating device illustrated in FIG. 7 but with the operating member of the operating unit moved towards an operated position.
Figure 9:
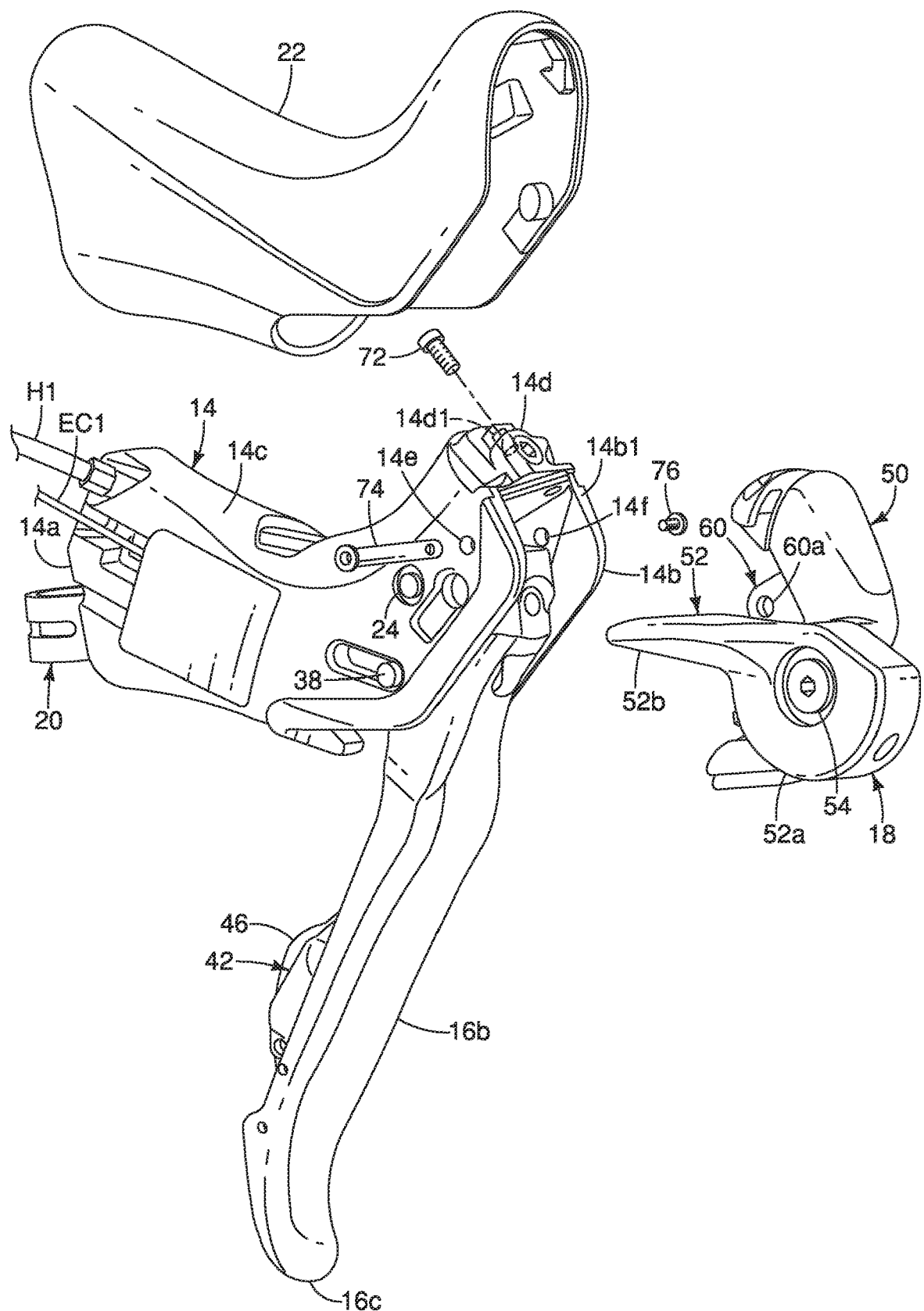
FIG. 9 is a partially exploded perspective view of the bicycle operating device illustrated in FIGS. 3 to 8, showing the operating unit detached from the first base member.

The cable take-up member 78 is disposed the internal space 50c of the operating member attachment portion 62. As seen in FIGS. 7 and 8, the cable take-up member 78 is configured to protrude from the second end portion 14b in a direction opposite to the first end portion 14a as viewed from a direction parallel to the lever axis A1 in a state where the mounting portion 60 is mounted to the second end portion 14b. The cable take-up member 78 includes a mechanical control cable attachment 80. The cable take-up member 78 has a take-up axis A3 extending along a direction parallel to the lever axis A1. The mechanical control cable attachment 80 is configured to connect the nipple 70 of the inner wire 68 to the cable take-up member 78. Here, the mechanical control cable attachment 80 is a recess that is sized to receive the nipple 70 of the inner wire 68. In this way, the operating member 52 further includes the mechanical control cable attachment 80.

Figure 14:
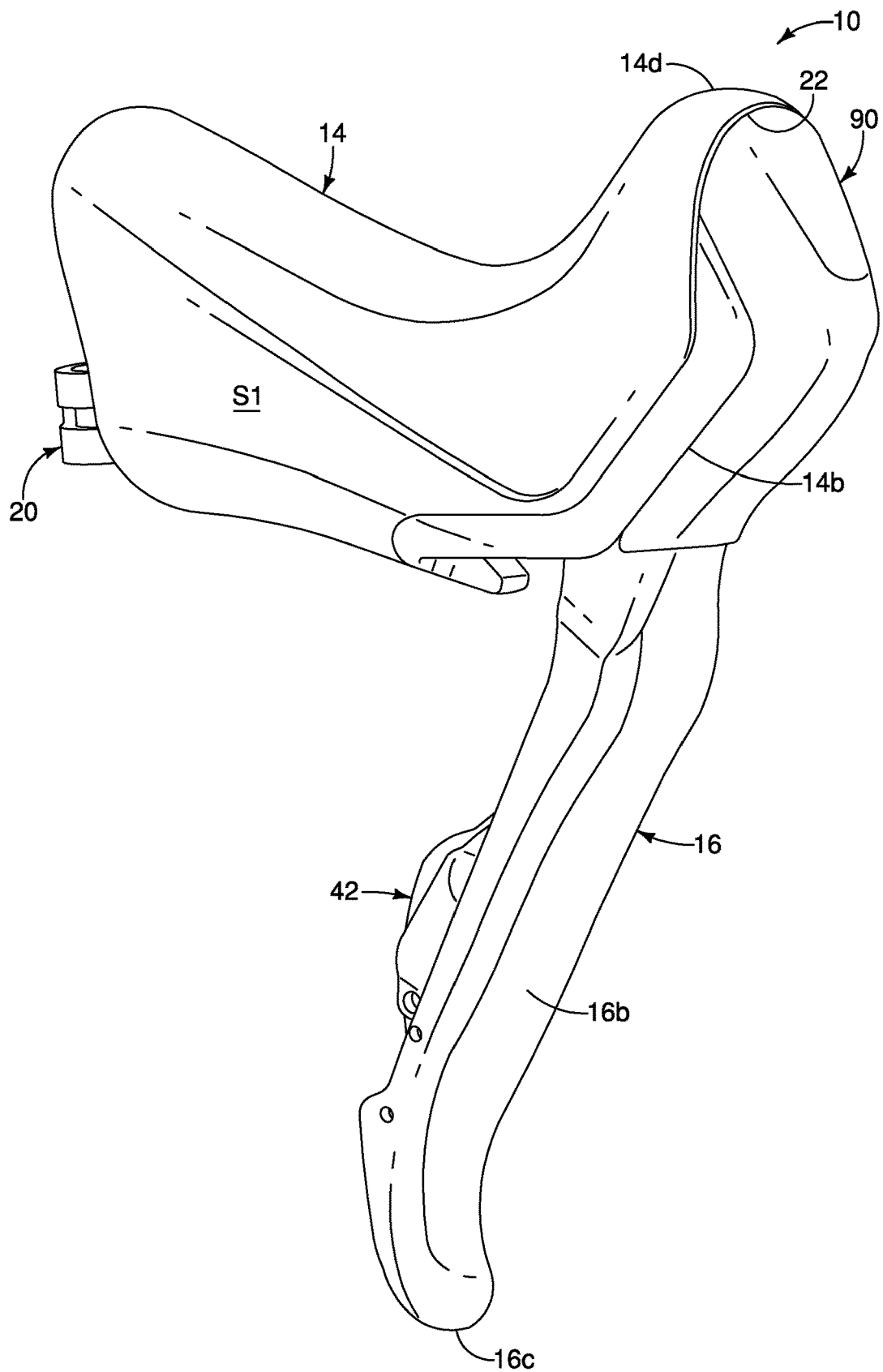
FIG. 14 is a side elevational view of the bicycle operating device illustrated in FIGS. 3 to 9 but with the operating unit removed and a cover detachably mounted to the first base member in place of the operating unit.
Figure 15:
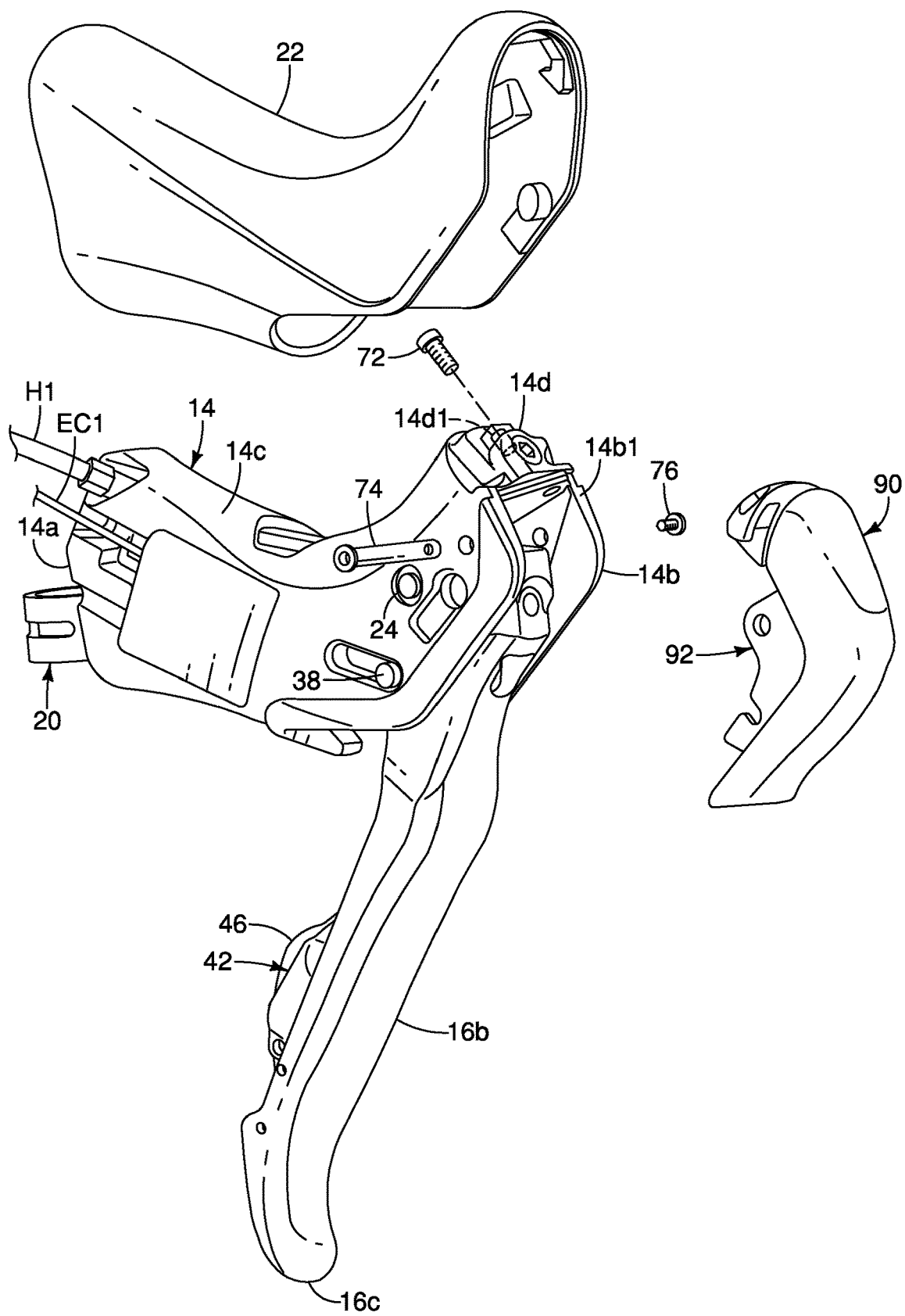
FIG. 15 is a partially exploded perspective view of the bicycle operating device illustrated in FIG. 14, showing the cover detached from the first base member.

Referring now to FIGS. 14 and 15, the bicycle operating device 10 further comprises a cover 90 that is configured to be detachably mounted to the second end portion 14b in place of the operating unit 18. In particular, as seen in FIG. 14, the bicycle operating device 10 is illustrated with the operating unit 18 having been removed and the cover 90 mounted to the first base member 14 in place of the operating unit 18. The cover 90 includes a mounting portion 92 that is detachably mounted to the first base member 14. The mounting portion 92 is identical to the mounting portion 60 as discussed above. Thus, the cover 90 is mounted to the first base member 14 in the same way that the operating unit 18 is mounted to the first base member 14. As a result, the cover 90 has an identical attachment structure as that of the operating unit 18. In other words, the cover 90 is mounted to the first base member 14 using the screw 72, the mounting shaft 74 and the screw 76.

Figure 16:
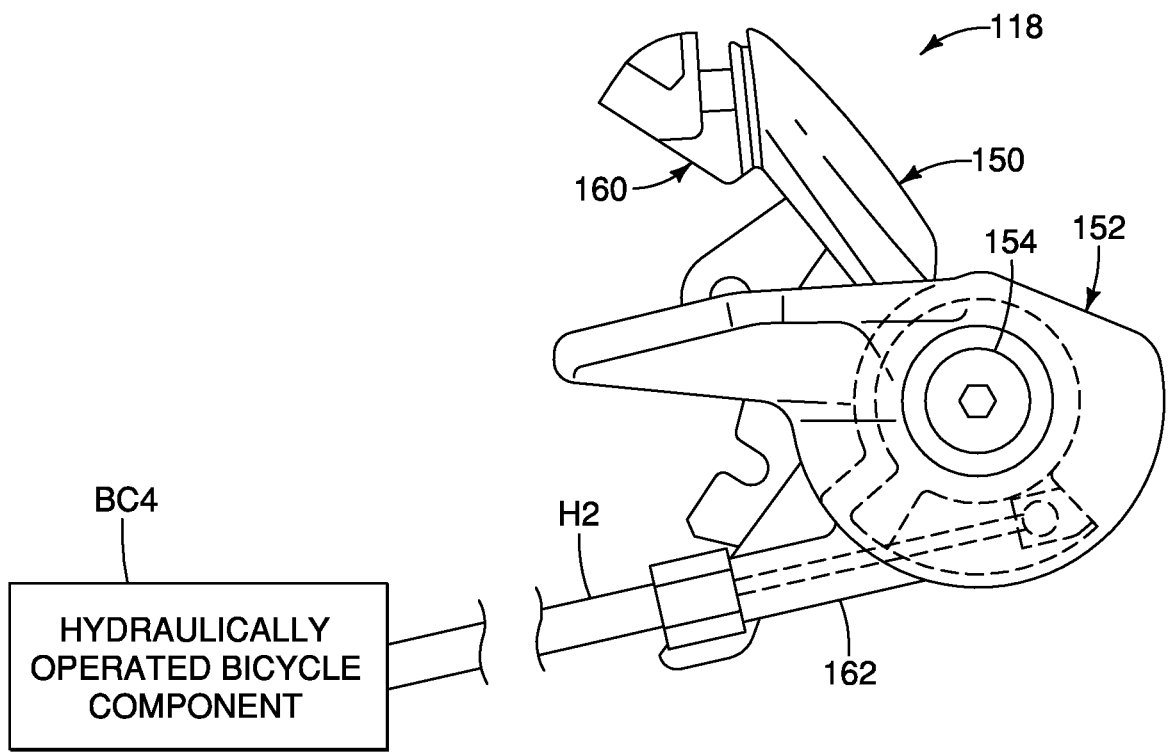
FIG. 16 is a diagrammatically view of a first alternate operating unit that is used in place of the operating unit of the bicycle operating device illustrated in FIGS. 3 to 9.

Referring now to FIG. 16, a first alternate operating unit 118 is illustrated that is configured to be used in place of the operating unit 18 of the bicycle operating device 10. In other words, the operating unit 18 can be removed from the first base member 14 and replaced with the operating unit 118. The operating unit 118 is a hydraulic operating unit that hydraulically operates a hydraulically operated bicycle component BC4. Here, the hydraulically operated bicycle component BC4 is a bicycle telescopic apparatus such as an adjustable seatpost or an adjustable suspension.

Basically, the operating unit 118 includes a second base member 150 and an operating member 152. The operating member 152 is pivotally attached to the second base member 150 by a fastener 154 (e.g., a fixing bolt) in the same way that the operating member 52 is mounted to the second base member 50. The second base member 150 includes a mounting portion 160 that is detachably mounted to the first base member 14. The mounting portion 160 is identical to the mounting portion 60 as discussed above. Thus, the operating unit 118 is mounted to the first base member 14 in the same way that the operating unit 18 is mounted to the first base member 14. As a result, the operating unit 118 has an identical attachment structure as that of the operating unit 18.

Here the operating unit 118 includes a hydraulic operating structure that is configured to transmit a hydraulic pressure in response to operation of the operating member 152. Thus, in the operating unit 118, the mechanical control cable attachment 80 of the operating unit 18 is replaced with the hydraulic operating structure. Specifically, in the operating unit 118, the hydraulic operating structure is a rotary vane actuator. Basically, the second base member 150 and the operating member 152 define a hydraulic chamber. The operating member 152 has a vane that is pivoted to force hydraulic fluid out of the hydraulic chamber through a passageway that is connected to a hydraulic hose H2. The hydraulic hose H2 is fluidly connected to the hydraulically operated bicycle component BC4.

Figure 17:
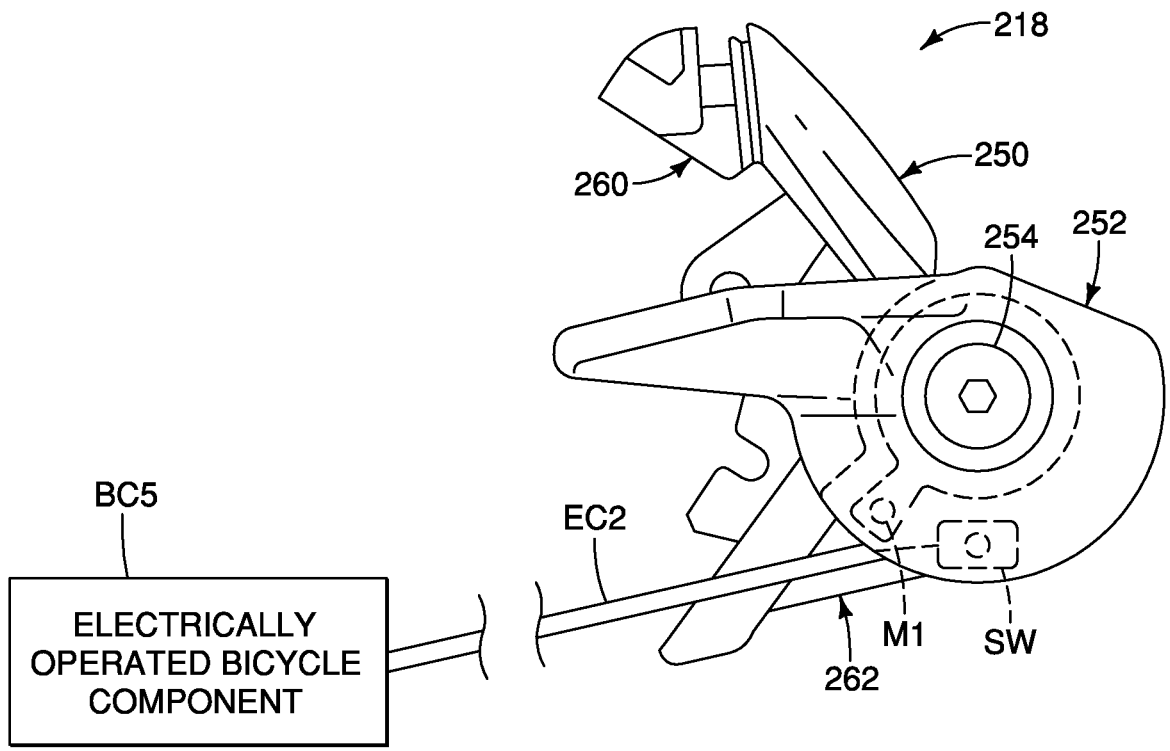
FIG. 17 is a diagrammatically view of a second alternate operating unit that is used in place of the operating unit of the bicycle operating device illustrated in FIGS. 3 to 9.

Referring now to FIG. 17, a second alternate operating unit 218 is illustrated that is configured to be used in place of the operating unit 18 of the bicycle operating device 10. In other words, the operating unit 18 can be removed from the first base member 14 and replaced with the operating unit 218. The operating unit 218 is an electrical operating unit that electrically operates an electrically operated bicycle component BC5. Here, the electrically operated bicycle component BC5 is an electric bicycle telescopic apparatus such as an electric height adjustable seatpost or an electric adjustable suspension.

Basically, the operating unit 218 includes a second base member 250 and an operating member 252. The operating member 252 is pivotally attached to the second base member 250 by a fastener 254 (e.g., a fixing bolt) in the same way that the operating member 52 is mounted to the second base member 50. The second base member 250 includes a mounting portion 260 that is detachably mounted to the first base member 14. The mounting portion 260 is identical to the mounting portion 60 as discussed above. Thus, the operating unit 218 is mounted to the first base member 14 in the same way that the operating unit 18 is mounted to the first base member 14. As a result, the operating unit 218 has an identical attachment structure as that of the operating unit 18.

Here the operating unit 218 includes an electrical switch SW that configured to output a signal to control the bicycle telescopic apparatus (e.g., the height adjustable seatpost ASP) in response to operation of the operating member 252. Thus, in the operating unit 218, the mechanical control cable attachment 80 of the operating unit 18 is replaced with the electrical switch. Specifically, in the operating unit 218, the electrical switch SW1 is a non-contact electrical switch such as Effect elements, reed switch, etc. The electrical switch SW1 is mounted to an operating member attachment portion 262 of the second base member 250. The electrical switch SW1 detects the presence of a magnet M1 that is mounted to the operating member 252. Alternatively, the electric switch SW1 can be optical sensor that detects one or more openings in the operating member 252. The electric switch SW1 is electrically connected to the electrically operated bicycle component BC5 (e.g., the height adjustable seatpost ASP) via an electrical cable EC2.

Figure 18:
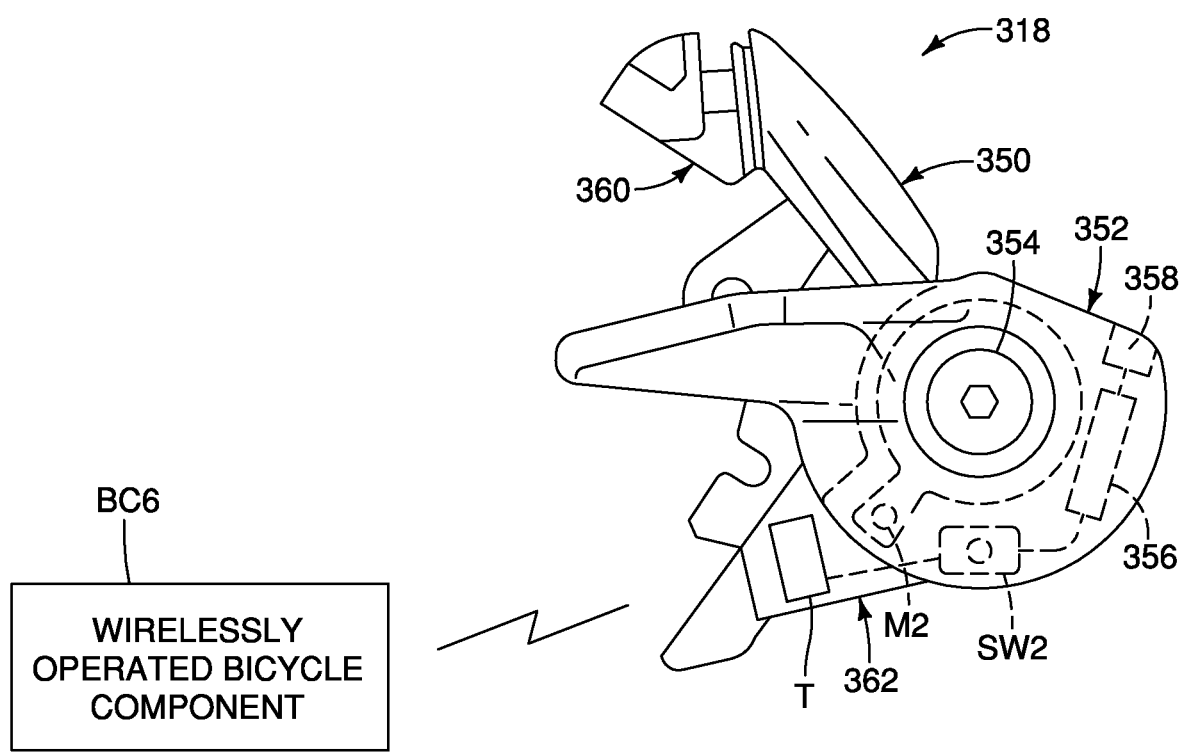
FIG. 18 is a is a diagrammatically view of a third alternate operating unit that is used in place of the operating unit of the bicycle operating device illustrated in FIGS. 3 to 9.

Referring now to FIG. 18, a third alternate operating unit 318 is illustrated that is configured to be used in place of the operating unit 18 of the bicycle operating device 10. In other words, the operating unit 18 can be removed from the first base member 14 and replaced with the operating unit 318. The operating unit 318 is a wireless operating unit that sends wireless signals to wirelessly operate a wirelessly operated bicycle component BC6. Here, the wirelessly operated bicycle component BC6 is an electric bicycle telescopic apparatus such as an electric height adjustable seatpost or an electric adjustable suspension.

Basically, the operating unit 318 includes a second base member 350 and an operating member 352. The operating member 352 is pivotally attached to the second base member 350 by a fastener 354 (e.g., a fixing bolt) in the same way that the operating member 52 is mounted to the second base member 50. The second base member 350 includes a mounting portion 360 that is detachably mounted to the first base member 314. The mounting portion 360 is identical to the mounting portion 60 as discussed above. Thus, the operating unit 318 is mounted to the first base member 14 in the same way that the operating unit 18 is mounted to the first base member 14. As a result, the operating unit 318 has an identical attachment structure as that of the operating unit 18.

Here the operating unit 318 includes an electrical switch SW that configured to output a signal to control the bicycle telescopic apparatus (e.g., an adjustable seatpost or an adjustable suspension) in response to operation of the operating member 352. Thus, in the operating unit 318, the mechanical control cable attachment 80 of the operating unit 18 is replaced with the electrical switch. Specifically, in the operating unit 318, the electrical switch SW2 is a non-contact electrical switch such as Effect elements, reed switch, etc. The electrical switch SW2 is mounted to an operating member attachment portion 362 of the second base member 350. The electrical switch SW2 detects the presence of a magnet M2 that is mounted to the operating member 352. Alternatively, the electric switch SW2 can be optical sensor that detects one or more openings in the operating member 352.

Here the operating unit 318 includes a wireless signal transmitter T that is configured to wirelessly transmit the signal. The electric switch SW2 is electrically connected to the wireless signal transmitter T to wirelessly transmit signals to the electrically operated bicycle component BC6 (e.g., an adjustable seatpost or an adjustable suspension) via an electrical cable C3. The wireless signal transmitter T is preferably disposed rear end portion of the operating member 352 to effectively transmit the signal to the bicycle component BC6.

Preferably, the operating unit 318 further includes a battery 356 and a charging port 358. Here, the battery 356 is illustrated as a rechargeable battery. However, it will be apparent to those skilled in the bicycle field from this disclosure that the battery 356 can be a replaceable battery such as a coin battery.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
   a first base member including a first end portion configured to be attached to a handlebar in a mounted state where the bicycle operating device is mounted to the handlebar, and a second end portion opposite to the first end portion, the first base member extending along a longitudinal direction from the first end portion to the second end portion;
a lever pivotally coupled to the first base member about a lever axis; and
an operating unit including
   a second base member including a mounting portion configured to be mounted to the second end portion of the first base member; and
   an operating member movably coupled to the second base member between a rest position and an operated position to operate a bicycle telescopic apparatus.

2. The bicycle operating device according to claim 1, wherein
the mounting portion is configured to be detachably mounted to a mounting surface of the second end portion of the first base member.

3. The bicycle operating device according to claim 2, wherein
the mounting surface faces the longitudinal direction of the first base member.

4. The bicycle operating device according to claim 1, wherein
the operating member includes a mechanical control cable attachment, the operating member is movable relative to the second base member between the rest position and the operated position to move a mechanical control cable.

5. The bicycle operating device according to claim 4, wherein
the operating member is configured to move the mechanical control cable without mechanically maintaining the mechanical control cable in a predetermined set position relative to the second base member during movement between the rest position and the operated position.

6. The bicycle operating device according to claim 4, wherein
the operating unit includes a cable take-up member configured to take up the mechanical control cable relative to the second base member.

7. The bicycle operating device according to claim 6, wherein
the cable take-up member has a take-up axis extending along a direction parallel to the lever axis.

8. The bicycle operating device according to claim 6, wherein
the cable take-up member is configured to protrude from the second end portion in a direction opposite to the first end portion as viewed from a direction parallel to the lever axis in a state where the mounting portion is mounted to the second end portion.

9. The bicycle operating device according to claim 1, wherein
the second base member further includes an operating member attachment portion to which the operating member is attached, and
the operating member attachment portion is at least partly offset from the mounting portion along a direction of the lever axis.

10. The bicycle operating device according to claim 9, wherein
the operating unit includes a cable take-up member configured to take up a mechanical control cable relative to the second base member, the operating member attachment portion including an internal space in which the cable take-up member is disposed.

11. The bicycle operating device according to claim 1, wherein
the operating unit includes a hydraulic operating structure configured to transmit a hydraulic pressure in response to operation of the operating member.

12. The bicycle operating device according to claim 1, wherein
the operating unit includes an electrical switch configured to output a signal to control the bicycle telescopic apparatus in response to operation of the operating member.

13. The bicycle operating device according to claim 12, wherein
the operating unit includes a wireless signal transmitter configured to wirelessly transmit the signal.

14. The bicycle operating device according to claim 1, wherein
the operating member moves along an operation path that intersects with the lever axis as viewed from a direction parallel to the lever axis.

15. The bicycle operating device according to claim 1, wherein
the first base member includes a first side surface and a second side surface facing opposite to the first side surface with respect to a direction parallel to the lever axis, the first side surface being disposed closer to a longitudinal center plane of a bicycle in the mounted state where the first end portion is coupled to the handlebar, and
the operating member is configured to at least partially face the first side surface in a state where the mounting portion is mounted to the second end portion.

16. The bicycle operating device according to claim 1, wherein
the first base member includes a gripping portion between the first end portion and the second end portion in the longitudinal direction,
the second end portion includes a pommel portion, and
the mounting portion is configured to be mounted to the pommel portion.

17. The bicycle operating device according to claim 16, wherein
the mounting portion is configured to form an exterior profile of a part of the pommel portion in a state where the mounting portion is mounted to the pommel portion.

18. The bicycle operating device according to claim 1, further comprising
a cover configured to be detachably mounted to the second end portion in place of the operating unit.

19. A bicycle operating device comprising:
a first base member including a first end portion configured to be attached to a handlebar in a mounted state where the bicycle operating device is mounted to the handlebar, and a second end portion opposite to the first end portion, the first base member having a longitudinal direction from the first end portion to the second end portion;
a lever pivotally coupled to the first base member about a lever axis; and
an operating unit including
   a second base member including a mounting portion configured to be detachably mounted to a mounting surface of the second end portion of the first base member, the mounting surface facing the longitudinal direction of the first base member; and an operating member movably coupled to the second base member between a rest position and an operated position.

20. bicycle operating device comprising:

a first base member including a first end portion configured to be coupled to a handlebar in a mounted state where the bicycle operating device is mounted to the handlebar, and a second end portion opposite to the first end portion, the first base member extending along a longitudinal direction from the first end portion to the second end portion;

a lever pivotally coupled to the first base member about a lever axis; and an operating unit including
- a second base member including a mounting portion configured to be mounted to the second end portion of the first base member; and
- an operating member movably coupled to the second base member between a rest position and an operated position to operate a bicycle telescopic apparatus, the operating member is movable about a pivot axis that is disposed farther from the first end portion than the lever axis in the longitudinal direction in a state where the mounting portion is mounted to the second end portion.

* * * * *